Aug. 5, 1941.  J. A. WASHINGTON  2,251,308
JACK
Filed July 15, 1940   2 Sheets-Sheet 2

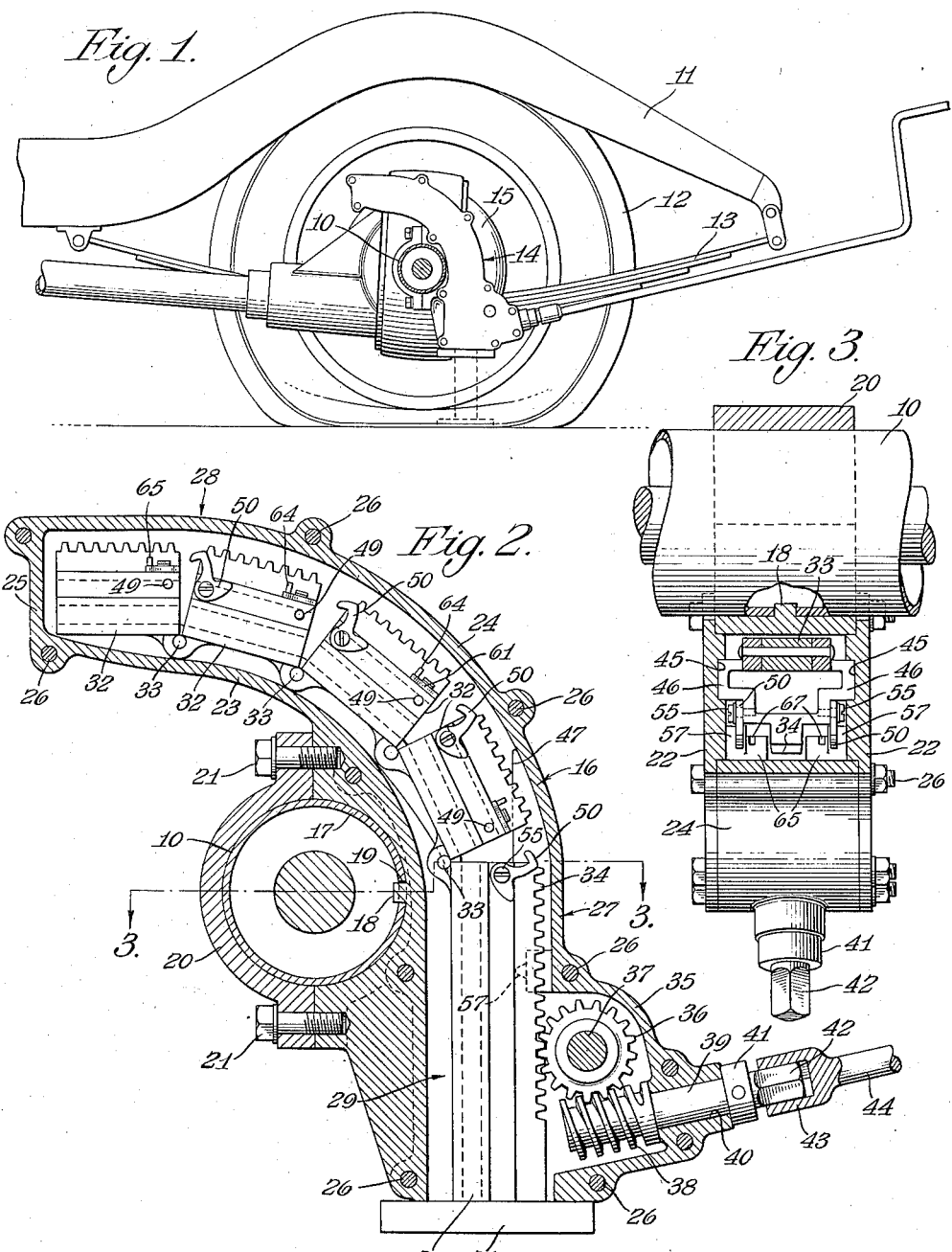

Joseph A. Washington.
INVENTOR
BY Victor J. Evans & Co.
ATTORNEYS
WITNESS

Patented Aug. 5, 1941

2,251,308

UNITED STATES PATENT OFFICE 2,251,308

JACK

Joseph Andrew Washington, Chicago, Ill.

Application July 15, 1940, Serial No. 345,645

1 Claim. (Cl. 254—95)

My invention relates to automotive vehicles and has among its objects and advantages the provision of an improved lifting jack which may be permanently attached to the vehicle.

An object of my invention is to provide a lifting jack which may be permanently attached to a vehicle in which the jack includes a lifting column made up of a plurality of hingedly connected sections and in which novel means are included for positively latching the sections in end to end relation for lifting purposes.

Another object is to provide a lifting jack having a lifting colunm made up of a plurality of hingedly connected sections arranged to be enclosed in a protective housing and in which novel means are provided for bringing the sections into end to end relation and latching the same into a rigid column for lifting purposes.

With these and other objects in view, this invention consists in certain novel features of construction, combination and arrangement of parts to be hereinafter more fully described and claimed.

For a complete understanding of my invention, reference is to be had to the following description and accompanying drawings, in which Figure 1 is a sectional view of the axle housing of a vehicle illustrating my invention applied thereto.

Figure 2 is a sectional view of the invention.

Figure 3 is a sectional view along the line 3—3 of Figure 2.

Figure 4:
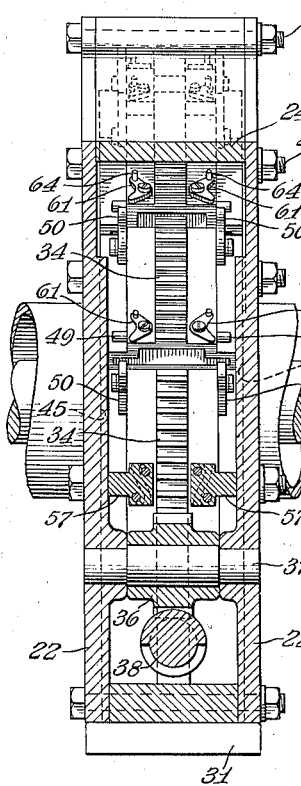
Figure 4 is an elevational sectional view.

In the embodiment selected to illustrate my invention, I make use of the axle housing 10 of an automotive vehicle. In Figure 1, I illustrate the frame structure of a vehicle at 11, the rear wheel at 12 and one of the rear springs at 13. My lifting jack 14 is mounted on the axle housing 10. Two of the jacks 14 may be connected with the axle housing on opposite sides of the differential housing 15. Jack 14 includes a housing 16 having a curved recess 17 shaped to partly house the axle housing 10. The housing 16 includes a lug 18 projecting through an opening 19 in the axle housing, to restrain the housing 16 from relative rotary movement about the axle housing. A clamped part 20 embraces the axle housing 10 and is fixedly secured to the housing 16 by bolts 21 threaded into the housing.

Housing 16 comprises side walls 22 and curved walls 23 and 24 cast integrally with an end wall 25. Side walls 22 are fixedly connected with the walls 23 and 24 through the medium of a plurality of bolts 26. It will thus be seen that the housing 16 provides a hollow body having a straight, vertical reach 27 and a curved reach 28 terminating at its outer end substantially at right angles to the vertical reach 27.

Inside the housing 16 I mount a movable column 29 comprising a first section 30 having a pressure plate or load carrying head 31 and a plurality of sections 32. The sections are hingedly connected together at 33. All the sections may comprise metal and are cast hollow for weight reduction and material saving purposes. Sections 32 are identical in construction and operation, while section 30 is identical with the sections 32 with the exception of its length and the load carrying plate 31. Each section is provided with a rack 34 extending longitudinally of the sections. Wall 24 together with the side walls 22 is shaped to provide a gear housing 35.

A pinion 36 is rotatably mounted on a shaft 37 anchored to the side walls. A worm 38 is arranged in mesh with the pinion 36, while the latter is arranged to mesh with the racks 34 as the column 29 is moved downwardly and upwardly of the housing 16. Worm 38 is fixedly related to a shaft 39 rotatable inside the bore 40 in the gear housing. A collar 41 fixedly connected with the shaft 39 cooperates with the worm 38 to restrain the shaft from endwise movement. I provide the shaft 39 with a squared end 42 for the reception of a socket 43. Socket 43 is formed at one end of the manually actuated crank 44. Figure 1 illustrates the manner in which the crank 44 may be applied to the shaft 39 for actuation purposes.

According to Figure 3, the side walls 22 are grooved at 45 for slidably receiving the ribs 46 of the sections 30 and 32. Grooves 45 extend from the bottom of the housing 16 up to a point corresponding approximately with the upper end of the section 30 in the position of Figure 2. Above that point, the sections 32 lie on the wall 23. In Figure 2, I illustrate one wall of the grooves 45 as being extended at 47 to provide a camming surface which engages the lower end of each section 32 as it is moved downwardly for guiding the lower ends of the sections into straight, end to end relation as they are moved downwardly or upwardly of the housing 16. To each face 48 and adjacent the bottom end of each section 32, I provide a latch pin 49. To the same faces on all the sections, with the exception of the upper section 32, I pivotally connect a latch hook 50. Each section 32 carries two latch pins 49, and I provide one latch hook 50 for each latch pin.

Figure 6:
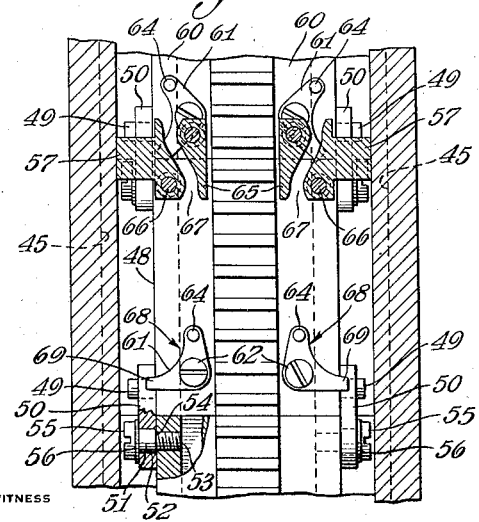
Figure 6 is a sectional view along the line 6—6 of Figure 5.
Figure 7:
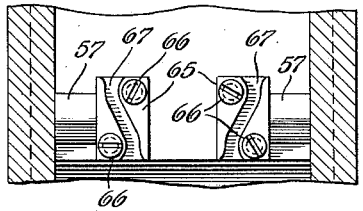
Figure 7 is a sectional view along the line 7—7 of Figure 5.

Figure 6 illustrates the manner in which the latch hooks 50 are pivotally mounted on the faces 48. All the latch hooks are mounted in the same manner so that the description of one will apply to all. The screw 51 passes through the opening 52 in the latch hook 50 and is threaded into the section 30 as at 53. The screw 51 includes a shoulder 54 which may be screwed tightly against the face 48 to fixedly anchor the screw. Between the head 55 of the screw and the latch hook 50 I interpose a spring washer 56 which has such pressure relation with the latch hook as to restrain it from accidental shifting about the screw 51 as an axis.

To the wall 24 I connect spaced cams 57 which are aligned with the cam elements 58 of the latch hook 50. Normally the latch hooks 50 are positioned according to Figure 2, but as the sections are moved into the form of a straight column, the latch hooks 50 are positioned according to Figure 5, at which time the hooks have connected relation with the pins 49 to restrain the sections from relative pivotal movement about the axes of the hinges 33. Latch hooks 50 together with the cam elements 58 are in the nature of bell cranks, while the cam elements 58 lie in the clear of the cams 57 when positioned according to Figure 2, but in the position of Figure 5 the cam elements 58 lie in the path of the cams 57 below the same. With the latch hooks 50 positioned according to Figure 2, downward movement of the lifting column 29 through rotation of the crank 44 brings the hooks 50 into engagement with the cams 57. Such engagement is consummated only after the section to be latched is moved into straight and end to end relation with the lower section to which it is connected. Engagement between the hooks 50 and the cams 57 pivot the hooks from the positions of Figure 2 to the positions of Figure 5.

Means are provided for latching the hooks 50 in connected relation with the pins 49. To each of the faces 60 on the sections 32, I connect a bell crank 61. The bell cranks 61 are pivotally mounted on screws 62 threaded into their respective sections 32. Between the heads of the screws 62 and the bell cranks 61 I position spring washers 63, see Figure 5, to restrain the bell cranks from accidental pivotal movement. Each bell crank carries a cam pin 64. Adjacent the cams 57 I position blocks 65, which may be anchored to the wall 24 by the screws 66. Cams 57 may be formed integrally with the blocks 65. Each block 65 is provided with a cam groove 67 arranged to receive the pins 64 along one side of the sections 32.

Figure 5:
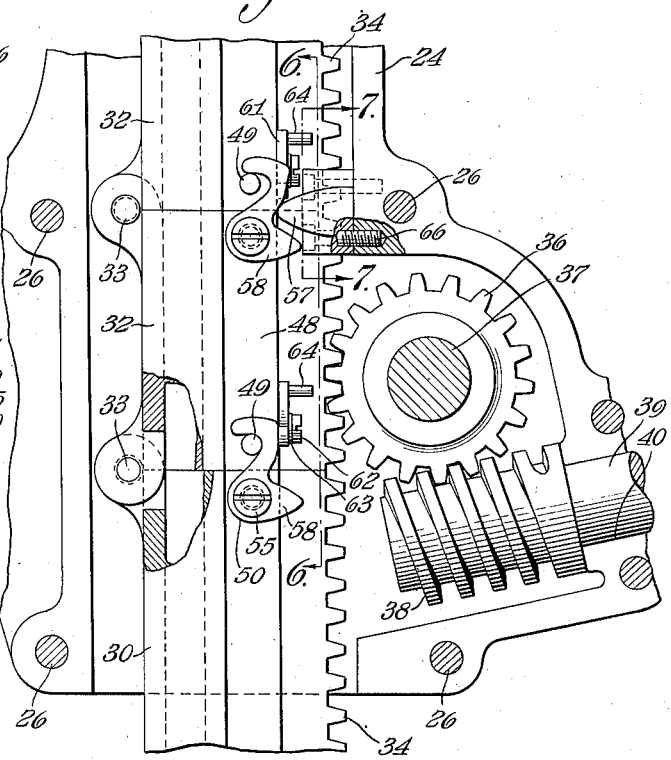
Figure 5 is an enlarged detail view illustrating the means for positively latching the hingedly connected sections with certain parts broken away for the sake of clearness.

Figure 4 illustrates the normal positions of the bell cranks 61 when the sections 32 lie in the curved run of the housing 16. As the column 29 is lowered through the medium of the crank 44, the pins 64 enter the grooves 67. During such extension of the column 29, the cams 57 engage the latch hooks 50 and pivot the hooks into connected relation with the pins 49, as illustrated in Figure 5. The hooks 50 are connected with the pins 49 before the pins 64 enter the grooves 67. As the pins 64 move downwardly of the grooves 67 their angular alignment pivots the bell cranks to the positions 68 of Figure 6, at which time the ends 69 of the bell cranks extend over the backs of the hooks 50 to hold them in place. Thus the hooks 50 are latched in connected relation with the pins 49 as the column 29 is extended for lifting purposes.

My invention is applicable to vehicles of conventional construction. The lifting jack is easily attached to the axle housing and the curved housing 16 deflects the column 29 laterally during elevation thereof, so as to conserve space underneath the vehicle. Crank 44 is detachably connected with the shaft 39. The vehicle may be lifted through mere rotation of the crank 44 in one direction. As the column 29 is projected from the housing 16, the sections of the column are latched in end to end and rigid relation so as to provide a sturdy lifting column. As the column 29 is moved inwardly of the housing 16 through rotation of the crank 44 in the opposite direction, the cams 57 engage the cam elements 58 and move the latch hooks 50 in the clear of the pins 49. Such camming relation is consummated after the pins 64 have moved through the grooves 67 for pivoting the bell crank 61 in the clear of the latch hooks 50. Because of the effective latch relation between the sections making up the column 29, the lifting run of the column assumes a rigid condition and is prevented from buckling. The column is capable of sustaining relatively heavy loads and the flexible nature of the column permits the lifting jack to be accommodated to modern vehicles as a permanent attachment. In addition, the lifting column may be made up of an unlimited number of hingedly connected sections so as to secure a lifting reach of unlimited proportions, depending upon the operating conditions for a given installation.

Without further elaboration, the foregoing will so fully explain my invention that others may, by applying current knowledge, readily adapt the same for use under various conditions of service.

I claim:

A lifting jack comprising a support provided with a curved guideway, a lifting column movable in said curved guideway, said lifting column comprising a plurality of sections hingedly connected together, said sections being provided with pins and hooks, means for moving the hook on one section into connected relation with the pin on an adjacent section as the two sections are brought into end to end relation, and means for latching the hooks in connected relation with said pins.

JOSEPH A. WASHINGTON.